Patented Nov. 20, 1945

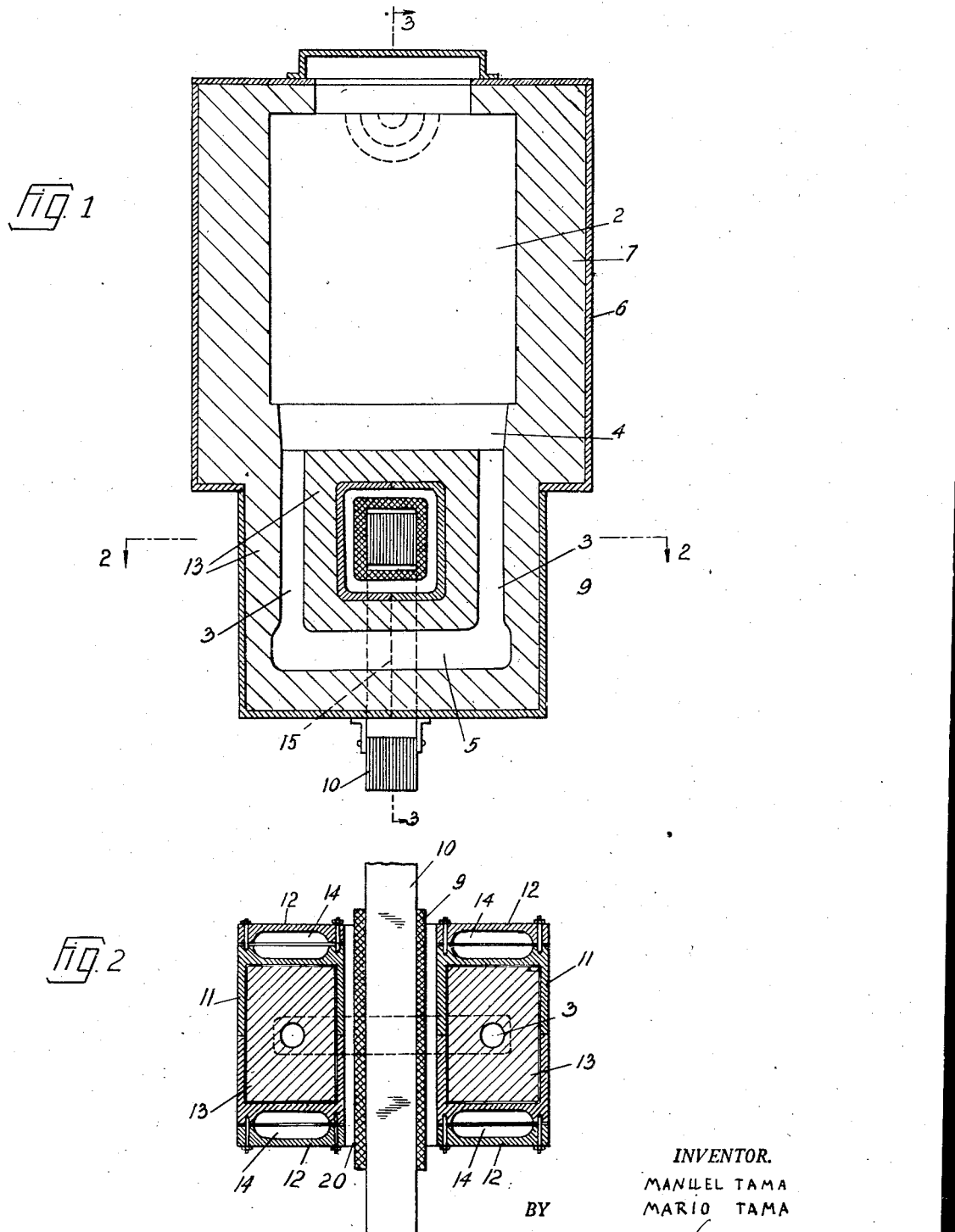

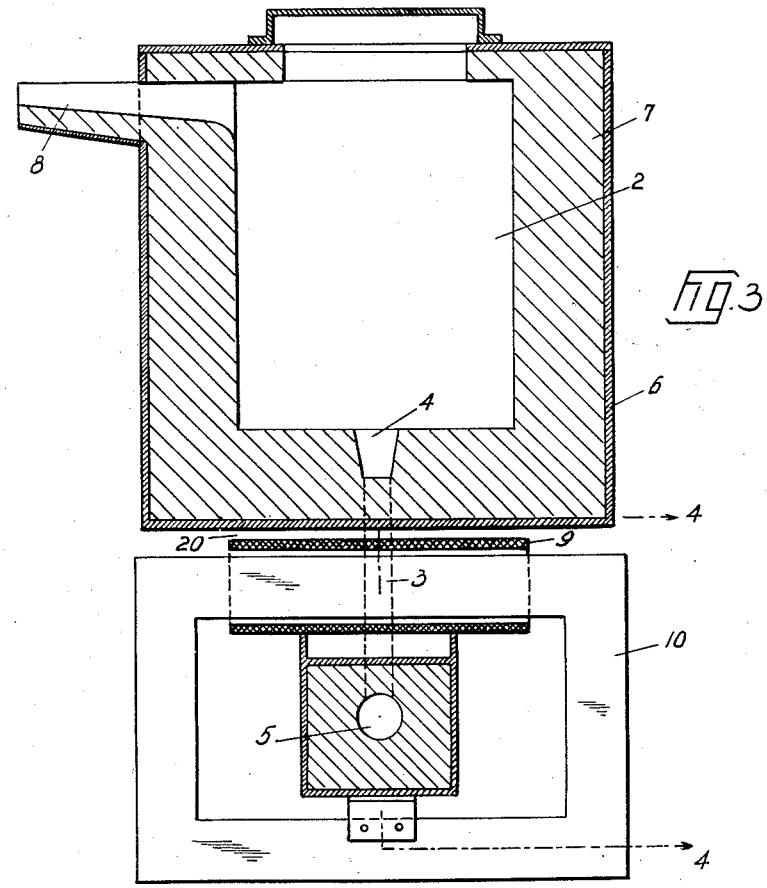
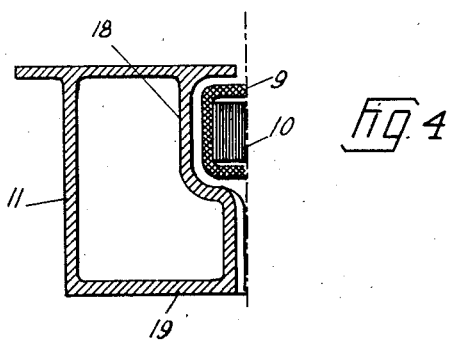

2,389,218

UNITED STATES PATENT OFFICE 2,389,218

COOLING SYSTEM FOR INDUCTION FURNACES

Manuel Tama and Mario Tama, Morrisville, Pa., assignors to Ajax Engineering Corporation, Trenton, N. J.

Application August 21, 1944, Serial No. 550,442

5 Claims. (Cl. 13—29)

This invention relates to an induction furnace and particularly to an induction furnace of the submerged resistor type. These furnaces are used at a rapidly increasing rate for melting non-ferrous metals and alloys.

Due to the electromotive forces and the resulting circulation of the molten charge initiated in the secondary heating channels by the primary a very satisfactory uniformity of the melt is accomplished; it might be justifiably stated that this effect of the submerged resistor type induction furnace is one of the main reasons for its great success.

A particular difficulty arises in the use of these furnaces when metal compositions or alloys are molten which are adapted to form low melting segregations of easy fluidity, a phenomenon which, for instance, has been observed in the melting of certain copper-lead and copper-lead-tin alloys.

In order to more fully explain this difficulty and its influence on the operation of a submerged resistor type induction furnace, a short analysis of certain characteristics of the same will be helpful.

As generally known, the molten metal circulating through the heating channels of a submerged resistor type induction furnace forms a secondary conductor or loop; this loop is arranged within the secondary block which is generally formed by ramming the same from suitable refractories.

If the block is dried and burned, it is inevitable that small cavities in the shape of cracks, channels, pores and fissures are formed.

The molten metal will enter these cavities from the side of the secondary loop; if allowed to penetrate through the secondary block towards the primary, it will attack and soon destroy the coils of the same and cause serious stoppages of the furnace operation.

The danger of a penetration of the secondary block from the melting channels to the primary is successfully prevented even if metals or alloys of a low melting point are molten by the hitherto customary cooling means and methods used in induction furnaces, for instance air blowers, whereby the secondary block is sufficiently cooled to cause metals or alloys entering the cavities thereof to solidify before the danger zone of the block is reached which lies in the vicinity of the primary.

If, however, metal compositions and alloys are molten which are inclined to form particularly low melting segregations of easy fluidity, the hitherto customary cooling devices will not prevent the penetration of these segregations through the cavities and channels of the secondary block with the result that the coils of the primary are attacked and destroyed after a surprisingly short time.

It, therefore, is the main object of this invention to successfully melt metal compositions and alloys in a submerged resistor type induction furnace, which are adapted and inclined to form low melting segregations of easy fluidity.

It is a further object of the invention to prevent these segregations to penetrate through the secondary block and to cause damages of the primary.

It is another object of the invention to subject these segregations which have the tendency to accumulate in the melting channels to a treatment which will result in a quick and effective solidification before they reach the danger zone of the secondary block; this is of particular importance because the section of the secondary block which is located in the vicinity of the primary is heated to a higher temperature than its other parts.

The means for effecting the early solidification of segregations of the above referred to type are attached to the furnace and constructed in such a manner that a permanent control of their operation is secured.

It is, therefore, also an object of the invention to locate these means within easy reach of the furnace operator and to render the same adapted to easy inspection.

With these and other objects in view which will become more apparent as this specification proceeds, the invention is illustrated by way of example in the attached drawings, wherein identical parts of the furnace are denominated with the same numerals.

In the drawings,

Fig. 1 is a vertical sectional elevation of the furnace embodied in this invention, Fig. 2 is a horizontal sectional elevation taken on line 2—2 of Fig. 1, Fig. 3 is a vertical sectional elevation taken on line 3—3 of Fig. 1, and Fig. 4 is a vertical sectional elevation taken on line 4—4 of Fig. 3.

As shown in the drawings, the principal parts of the furnace are the upper hearth 2 holding the bulk of a molten metallic charge adapted to form low melting segregations of easy fluidity.

The secondary loop consisting of heating and melting channels 3 is located underneath upper hearth 2 in the secondary block 13.

A groove 4 is provided in the bottom section of the hearth; the two melting channels 3 connect this groove with a horizontal bottom channel 5.

The furnace is provided with the customary air blower, not shown in the drawings, to circulate air through coil duct 20.

The upper hearth is encased in a housing 6 provided at the inside with a suitable refractory lining 7; a spout 8 serves to pour the charge from the furnace which is tiltably supported in the customary manner, not shown in the drawings.

The transformer assembly or primary comprises coils 9 of insulated copper wire which in the operation of the furnace may be connected to a single phase supply source of standard frequency alternating current, not shown in the drawings.

An iron core 10 threads the primary and is closed in itself.

In order to prevent the penetration of the secondary block 13 towards the primary by the low melting easily fluid segregations formed from the molten charge cooling jackets 11 are provided; the cavities 14 of these water jackets are connected to a customary feeding and discharging tube system for the cooling fluid, not shown in the drawings.

The shape and the location of these cooling jackets forms the subject matter of the invention.

As shown in Fig. 2, the cooling fluid conducting cavities 14 of the jackets 11 are located outside of the coil duct 20 at opposite outer faces of the secondary block.

The secondary block 13 is surrounded by a metallic casing 11 which is preferably composed of sections having a partition and an insulated joint at the central plane indicated by a dotted line 15 in Fig. 1. By locating the jackets outside of the coil duct the danger of the entry of water into the coil duct 20 due to leakage of the jacket is prevented.

At the same time the cooling jackets are located for easy approach and their cooling effect is transmitted to the surface portion of the secondary block which is adjacent to the primary; the cooling jackets are preferably arranged symmetrically on both sides of the primary coil 9.

Covers 12 are provided to open and to close the cooling fluid conducting cavities 14 of the cooling jackets.

The upper section 18, see Fig. 4, of the inside wall of the cooling jackets which is adjacent to the primary, is shaped to conform with the outer contours of the same; the bottom portion 19 situated underneath the primary extends towards the center plane of the furnace.

The water jackets made of a suitable material of high heat conductivity, for instance bronze, encase the secondary block; those parts which contain the cooling fluid carrying cavities 14 are, as previously mentioned, located at the outer faces of the block in such a manner that the cooling effect is transmitted to the surface portions of the block which surround the primary.

By this cooling action the segregations entering the minute channels and fissures of the secondary block from the side of the melting channels are solidified at an early stage of entering into the block and prevented from further penetration into the same and long before the danger zone of the secondary block is reached; any attack on the primary coils by the segregations is eliminated and a stoppage free operation of the furnace is secured. The location of the cavities 14 at easily accessible places permits permanent control and inspection of a satisfactory operation.

Various changes may be made of the constructional details of the cooling jacket described in the specification without departing from the spirit of the invention or sacrificing advantages thereof; furthermore, the invention may also be used with other induction furnaces, where similar problems arise.

We claim:

1. An induction furnace of the submerged resistor type particularly for melting metallic charges adapted to form low melting segregations of easy fluidity comprising a housing provided with a refractory inside lining, an upper hearth and a secondary loop in said housing, said loop being located underneath said hearth, a primary threading said secondary loop, a secondary block accommodating said primary and said loop, cooling jackets attached to said secondary block symmetrically located at both sides of the primary to transmit the cooling effect of said jackets to the surface portion of said secondary block adjacent said primary, the upper portion of said jackets being shaped to conform to the outer contours of the primary, the bottom portion located underneath said primary being enlarged towards the center plane of the furnace.

2. An induction furnace of the submerdged resistor type particularly for melting metallic charges adapted to form low melting segregations of easy fluidity comprising a housing provided with a refractory inside lining, an upper hearth and a secondary loop in said housing, said loop being located underneath said hearth, a primary threading said secondary loop, a secondary block accommodating said primary and said loop, cooling jackets attached to said secondary block symmetrically located on both sides of the primary to transmit the cooling effect of said jackets to the surface portion of said secondary block adjacent said primary, the cavities of said jackets to be traversed by the cooling medium located at opposite faces of said secondary block, the upper portion of said jackets being shaped to conform to the outer contours of the primary, the bottom portion being located underneath the primary being enlarged towards the center plane of the furnace, and a cover to open and to close said cavities.

3. An induction furnace of the submerged resistor type particularly for melting metallic charges which form low melting segregations of easy fluidity, comprising a housing provided with a refractory inside lining, an upper hearth and a secondary loop in said housing, said loop being located underneath said hearth, a primary threading said secondary loop including a primary coil, a coil duct accommodating said coil, a secondary block accommodating said primary and said secondary loop, water jackets attached to said secondary block at places outside of said coil duct to transmit the cooling effect of said jackets to the surface portions of said secondary block adjacent said primary.

4. An induction furnace of the submerged resistor type particularly for melting metallic charges which form low melting segregations of easy fluidity, comprising a housing provided with a refractory inside lining, an upper hearth and a secondary loop in said housing, said loop being located underneath said hearth, a primary threading said secondary loop including a primary coil, a coil duct accommodating said coil, a secondary block accommodating said primary and said secondary loop, a metallic bushing encasing said secondary block and provided with water jackets, said water jackets being located outside of said coil duct at outer faces of the secondary block to transmit the cooling effect of said jackets to the surface portion of said secondary block adjacent said primary.

5. An induction furnace of the submerged resistor type particularly for melting metallic charges which form low melting segregations of easy fluidity, comprising a housing provided with a refractory inside lining, an upper hearth and a secondary loop in said housing, said loop being located underneath said hearth, a primary threading said secondary loop including a primary coil, a coil duct accommodating said coil, a secondary block accommodating said primary and said secondary loop, a metallic bushing composed of a plurality of sections encasing said secondary block and provided with water jackets, said water jackets being located outside of said duct at opposite outer faces of the secondary block to transmit the cooling effect of said jackets to the surface portion of said secondary block adjacent said primary.

MANUEL TAMA.
MARIO TAMA.